Oct. 23, 1934.   A. W. ANTHONY, JR   1,978,007
HUMIDIFYING APPARATUS
Filed June 6, 1930

Witness
Paul F. Bryant

Inventor
Alfred W. Anthony Jr.
by his attorneys
Van Everen Fish Hildreth & Cary

Patented Oct. 23, 1934

1,978,007

UNITED STATES PATENT OFFICE 1,978,007

HUMIDIFYING APPARATUS

Alfred W. Anthony, Jr., Belmont, Mass., assignor to Pease, Anthony Equipment Co., Cambridge, Mass., a corporation of Massachusetts Application June 6, 1930, Serial No. 459,470

4 Claims. (Cl. 261—91)

The present invention relates to improvements in apparatus for the humidification of gases, more particularly air.

The purpose of the invention is to provide a relatively simple and compact form of apparatus for this purpose which accomplishes the desired humidification of a comparatively large volume of air without occupying excessive space. In accordance with this purpose, it is also an object of the invention to provide a relatively compact and portable form of self-contained apparatus which is capable of employment for domestic use, as the humidification of living rooms, offices, and similar space.

With this and other objects in view, the various features of the invention consist in certain novel features of construction, combinations and arrangements of parts hereinafter described and claimed, the advantages of which will be obvious to those skilled in the art from the following description.

Figure 1:
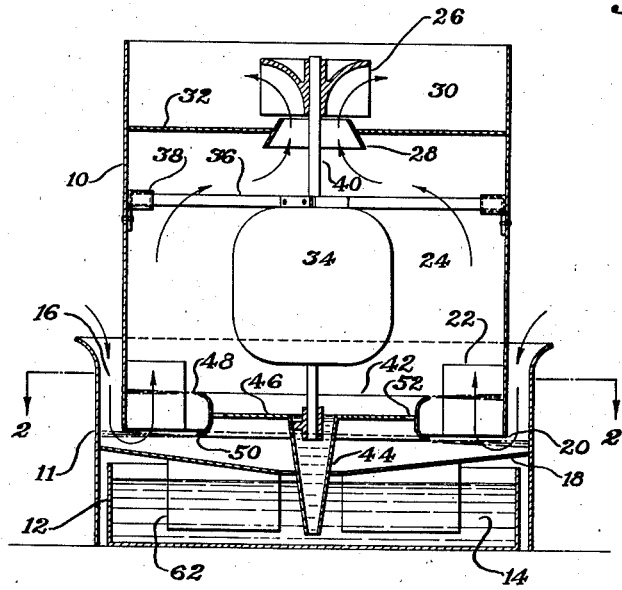
Figure 2:
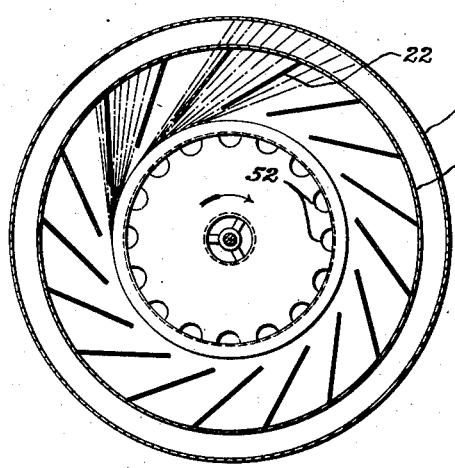

In the accompanying drawing illustrating the preferred form of the invention,

Fig. 1 represents a section in elevation of my improved humidifying apparatus; and Fig. 2 is a section of the apparatus on the section lines 2—2 of Fig. 1.

According to the illustrated embodiment of the invention, the air to be humidified, which is relatively dry and capable of absorbing a high proportion of moisture per unit of volume, is caused to pass directly through a spray of water in substantial volume, which is intimately mixed with the air in such a fashion that a comparatively large volume of the water is absorbed and evaporated thereby. In the simplest and most efficient form of the invention which has yet been devised, I create a relatively fine spray by centrifugally spinning one or more thin films of water from a rapidly rotating head. This spray is of a sufficient degree of fineness to be readily absorbed by air with which it immediately comes in contact, and because of this relatively fine subdivision is incapable of maintaining its traversing velocity at a substantial distance beyond the peripheral delivery edge. In actual practice the incoming air to be humidified is first directed downwardly within an annular passage, intersecting the lower spray, thence upwardly again intersecting the lower spray, and finally the upper spray to promote the greatest amount of contact between the air and the spray throughout a minimum period of travel. After emerging from the upper spray, the air is drawn upwardly, and thence directed outwardly from the upper portion of the apparatus by a suitable form of fan without the necessity of baffling or similar means for removal of entrainment, the air having sufficient capacity for absorption of moisture to substantially completely evaporate all water, vapor or liquid which may be picked up thereby.

Referring to the drawing, the humidifying apparatus comprises generally a casing 10 of generally cylindrical outline adapted to serve as a support and surround a separable basin 12 which contains a supply of humidifying liquid, as water. The lower portion of the casing 10, indicated at 11, is somewhat larger than the upper portion of the casing to provide an annular intake passage 16 extending about the casing portion for the downward passage of air therethrough. The casing portion 11 is provided with a depressed or generally conical partition 18 which serves to reverse the direction of flow of the entering air about the lower edge 20 of the casing and direct it upwardly within the casing. Mounted within the casing immediately above the edge 20 are a series of directing vanes or partitions 22 which are located circumferentially about the casing and are uniformly spaced in a general tangential relation to the periphery of the spray head for a purpose to be presently described. The air after its passage upwardly through the vanes 22 flows freely through the unrestricted upper portion of the chamber 24, and is thence drawn outwardly by an exhaust fan, indicated at 26, the fan having a relatively restricted central intake portion 28 through which the air is caused to pass. From the fan the humidified air passes outwardly through the upper outer portion 30 of the casing, this portion being separated from the humidifying chamber proper by a top or partition 32 upon which is mounted the intake duct 28 from the fan.

The moving parts of the apparatus are conveniently operated by a small motor 34 which is supported by a series of flat spring arms 36 connected at their inner ends tangentially with the hub of the motor housing, and supported at their outer ends by brackets 38. The fan 26 is mounted directly on the upper end of the motor shaft 40 which carries at its lower end a rotary spray head 42 communicating with a conical tube 44 which dips within the liquid 14 and serves as a pump to draw liquid from the reservoir upwardly to the rotating spray head. Liquid thus elevated by the conical tube is delivered outwardly in a thin film across the disk 46, and is thence sprayed in two sheets from the upper and lower delivery edges 48 and 50 of the flange surrounding the disk. The liquid is distributed to upper and lower portions of the flange through a series of openings 52. It will be noted that the delivery edges of the spray head rotate in close proximity to the inner ends of the directing vanes 22, and that the spray delivered from the edges tends to fly outwardly from the delivery edge into the spaces afforded between the vanes without substantial interference thereby. Inspection of Fig. 1 will indicate that the lowermost spray delivered from the edge is slightly below the level of the lower edges of the directing vanes 22 and edge 20 of the casing, this spray traveling outwardly until it impinges upon the side wall of the basin 12. The upper spray, on the other hand, enters directly into the spaces formed by the partition vanes, and serves to thoroughly wet the walls of the vanes due to the moisture being carried thereover by gravity. With this construction it will be evident, therefore, that the air entering through the annular passage first intercepts the lower spray at the bottom of the chamber 16, again intercepts this spray upon its reversal of direction upwardly through the partition vane, encounters the wet walls of the partition vanes on passage therethrough, and finally emerges through the upper spray into the chamber thereabout. I have found that it is important in this type of apparatus to avoid and minimize the swirling of the air during the process of humidification, this swirling of the air tending to centrifugally eject moisture and reduce the volume which may otherwise be absorbed in any given unit of time. The provision of the tangential vanes 22 prevents swirling action of the air, either due to its incoming direction and velocity or due to the swirling action of the spray initiated by the rotating head. By reducing to a minimum and substantially eliminating this swirling tendency on the part of the air, I am enabled to provide a form of spray head capable of delivering an exceedingly fine spray in close proximity to the surrounding envelope of air, the whole serving to promote an exceedingly intimate mixture of moisture and air in a comparatively small space. As a result I am enabled to obtain a very substantially higher degree of humidification than would otherwise be possible in apparatus of this capacity.

It will be evident that moisture not absorbed by the air runs downwardly onto the depressed partition 18, and is thence returned through the central opening 60 into the reservoir. The latter may conveniently be provided with baffles 62 to avoid swirling or turbulence of the water in the reservoir through the rotation of the conical pump 44 dipping therein.

Although the present apparatus is particularly designed for delivering a comparatively large amount of moisture for humidifying purposes to air or similar gases, neverthless there are certain features of the apparatus which may conceivably be employed to advantage in connection with the scrubbing of gases, as in the removal of foreign matter, as dust, from the gases and air. It will also be evident that in the process of humidifying where the prime function is to supply moisture to the air, there is nevertheless a distinct and effective washing of the air in apparatus of this character, due to the wetting down and consequent removal of dust and similar material which in its dried condition normally flows with the air.

It will be furthermore noted that owing to the tangential arrangement of the partition members, drops of spray thrown off from the rapidly rotating head enter between the partition members and in a direction generally parallel thereto rather than impinging directly upon the partition members, and thus immediately destroying or minimizing their humidifying capacity. Inspection of the drawing will indicate that the rotation of the spray head is such as to deliver the spray tangentially in approximate parallelism with the tangential vanes, thus prevention of air swirling is accomplished without substantial interference with the functioning of the spray, and in addition a substantial wet area in contact with the moving air current is presented.

What is claimed is:

1. Humidifying apparatus comprising a casing forming a humidifying chamber, a motor rotating about a vertical axis within the chamber, a rotary spray head below the motor and connected thereto, flat imperforate partition vanes disposed in tangential relation to the periphery of the spray head and in proximity thereto, an enlarged lower portion connected with the casing and communicating with the interior through a downwardly extending annular passage, a partition in the lower member diverting incoming air upwardly through the partition vanes and spray therein, and a fan at the upper end of the chamber withdrawing air outwardly from the chamber.

2. Humidifying apparatus comprising a casing enclosing a humidifying chamber, an electric motor within the chamber, a vertical motor shaft, a rotary spray head connected to the shaft below the motor and rotating centrally of the chamber, a water reservoir below the spray head, means for elevating water from the reservoir to the spray head, a series of flat imperforate partition vanes disposed about the spray head in tangential relation to the periphery thereof and substantially filling the space beyond the spray head, and means for directing air to be humidified first downwardly and thence upwardly through the vanes to intercept the spray a plurality of times in its traverse through the apparatus.

3. Humidifying apparatus comprising a rotary spray head designed to deliver an outwardly radiating spray, a cylindrical casing about the spray head having an outer portion and an inner portion providing an annular passage extending downwardly and inwardly within the casing, means for supporting the spray head for rotation within the inner portion, a separate liquid basin within the lower part of the outer casing portion, a pump member arranged to dip within the central part of the basin positioned within the casing, and a partition between the inner surface of the outer casing portion between the lower edge of the inner casing portion and the basin to prevent liquid from escaping the basin after being thrown from the spray head and to direct the air coming through the annular passage inwardly of the casing.

4. Humidifying apparatus comprising an electric motor, a rotary spray head secured to the motor shaft to deliver an outwardly radiating spray, a casing about the spray head and motor having an outer portion and an inner portion providing an annular passage extending downwardly and inwardly within the casing, means for supporting the motor on resilient mountings secured within the inner casing, a partition having a central opening within the inner casing above the motor and spray head, and an exhaust fan attached to the motor shaft and operating in an unrestricted free space into which the air is exhausted above the partition.

ALFRED W. ANTHONY, Jr.